(12) United States Patent
Zushi et al.

(10) Patent No.: US 9,654,036 B2
(45) Date of Patent: May 16, 2017

(54) POWER CONVERSION DEVICE AND POWER CONVERSION METHOD

(71) Applicant: NISSAN MOTOR CO., LTD., Yokohama-shi, Kanagawa (JP)

(72) Inventors: Yusuke Zushi, Kanagawa (JP); Jon C. Clare, Nottingham (GB); Alan Watson, Nottingham (GB)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/029,445

(22) PCT Filed: Oct. 2, 2014

(86) PCT No.: PCT/JP2014/076368
§ 371 (c)(1),
(2) Date: Apr. 14, 2016

(87) PCT Pub. No.: WO2015/056571
PCT Pub. Date: Apr. 23, 2015

(65) Prior Publication Data
US 2016/0276964 A1 Sep. 22, 2016

(30) Foreign Application Priority Data
Oct. 17, 2013 (JP) .................................. 2013-216278

(51) Int. Cl.
*H02P 1/04* (2006.01)
*H02P 6/14* (2016.01)
(Continued)

(52) U.S. Cl.
CPC ............ *H02P 6/14* (2013.01); *B60L 11/1803* (2013.01); *B60L 11/1864* (2013.01);
(Continued)

(58) Field of Classification Search
USPC ........... 318/400.17, 400.2, 400.26, 801, 803, 318/400.29
See application file for complete search history.

(56) References Cited

U.S. PATENT DOCUMENTS 6,058,032 A * 5/2000 Yamanaka .......... B60L 11/1803
318/768
9,257,848 B2 * 2/2016 Coccia .................... H02J 3/383
(Continued)

FOREIGN PATENT DOCUMENTS

JP 10-070886 A 3/1998
JP 2005-224012 A 8/2005
(Continued)

*Primary Examiner* — Bentsu Ro
*Assistant Examiner* — Iftekhar Mustafa
(74) *Attorney, Agent, or Firm* — Foley & Lardner LLP

(57) ABSTRACT

There is provided a power conversion device including a plurality of Direct Current (DC) power sources (VB) that converts an output voltage of each of the DC power sources into an Alternating Current (AC) voltage, and outputs the converted AC voltage in series connection, and the device includes: a DC/DC converter (21) connected to each of the DC power sources (VB) to convert the output voltage of the DC power sources; a control device (31) that controls an output voltage of the each DC/DC converter (21); and an H-bridge circuit (22) provided on the output side of the DC/DC converter (21) to convert the voltage output from the DC/DC converter (21) into an AC voltage.

6 Claims, 8 Drawing Sheets

(51) Int. Cl.
*B60L 11/18* (2006.01)
*B60L 15/00* (2006.01)
*H02M 7/48* (2007.01)
*H02M 7/49* (2007.01)
*H02J 7/00* (2006.01)

(52) U.S. Cl.
CPC .......... *B60L 15/007* (2013.01); *H02J 7/0065* (2013.01); *H02M 7/4807* (2013.01); *H02M 7/49* (2013.01); *B60L 2210/10* (2013.01); *B60L 2210/42* (2013.01); *B60L 2240/526* (2013.01); *B60L 2240/527* (2013.01); *B60L 2270/147* (2013.01); *Y02T 10/645* (2013.01); *Y02T 10/7005* (2013.01); *Y02T 10/7061* (2013.01); *Y02T 10/7216* (2013.01); *Y02T 10/7241* (2013.01)

(56) References Cited

U.S. PATENT DOCUMENTS

| | | |
|---|---|---|
| 2006/0067655 A1 | 3/2006 | Okuda et al. |
| 2011/0249472 A1 | 10/2011 | Jain et al. |
| 2014/0327306 A1 | 11/2014 | Inoue |

FOREIGN PATENT DOCUMENTS

| | | |
|---|---|---|
| JP | 2006-101675 A | 4/2006 |
| JP | 2011-155786 A | 8/2011 |
| JP | 2012-228015 A | 11/2012 |
| WO | WO 2009/105734 A2 | 8/2009 |
| WO | WO 2012/116750 A1 | 9/2012 |
| WO | WO 2013/118336 A1 | 8/2013 |

\* cited by examiner

FIG. 10
(a) 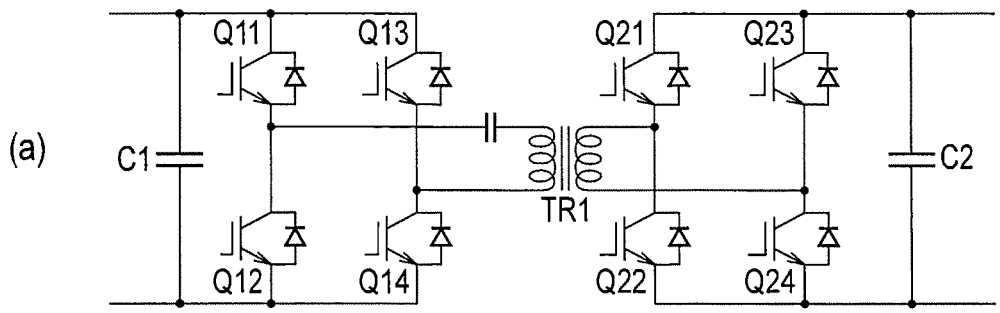
(b) 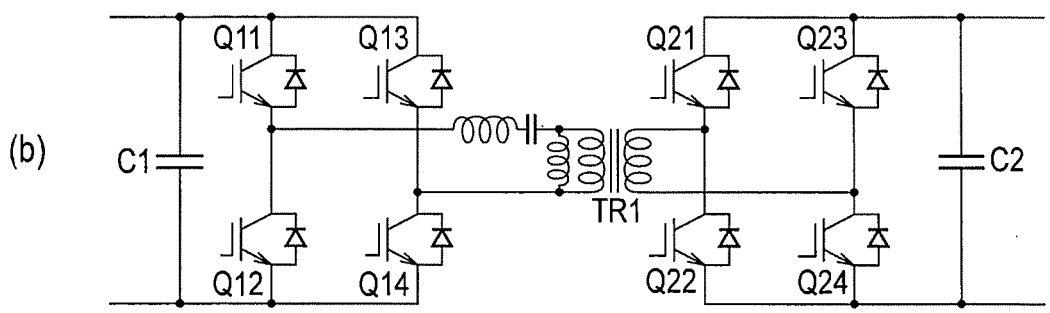
(c) 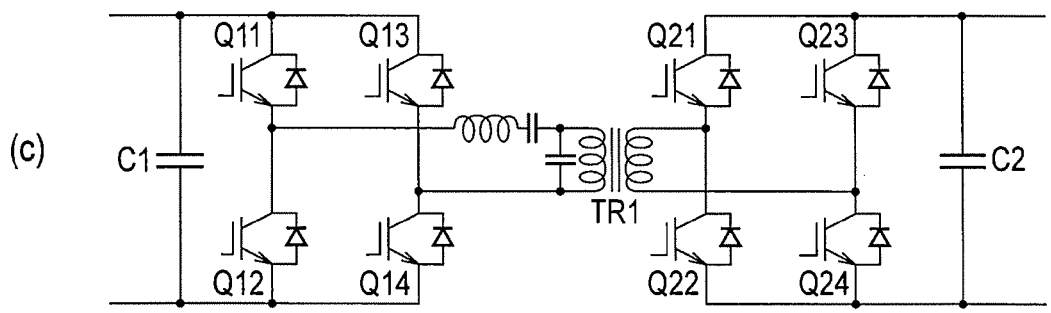
(d) 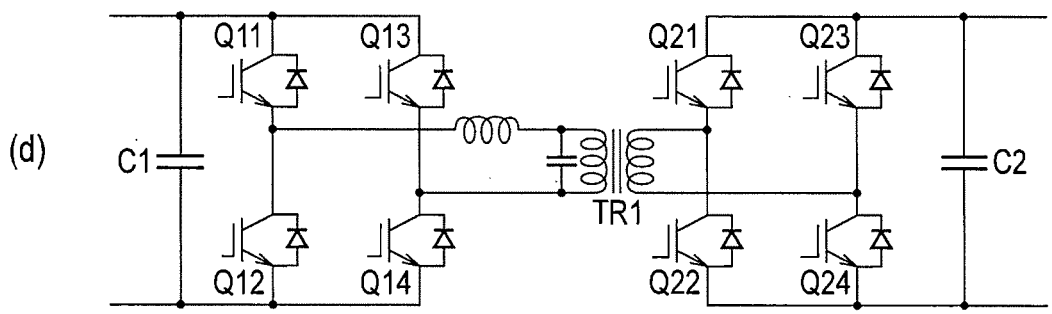

POWER CONVERSION DEVICE AND POWER CONVERSION METHOD

TECHNICAL FIELD

The present invention relates to a power conversion device and a power conversion method which convert power output from a Direct Current (DC) power source into an Alternating Current (AC) power.

BACKGROUND ART

There has been proposed a distributed modular power source as a power source device for driving a load of an AC motor or the like. The distributed modular power source is provided with a plurality of DC power sources and converts DC voltage output from each of the DC power sources into AC voltage, by using an inverter. Furthermore, the distributed modular power source serially adds the AC voltages output from each of the inverters to thereby generate AC voltage of a desired level and supplies the AC voltage to a load. A power source described in Patent Literature 1 is known as such a power source device.

CITATION LIST

Patent Literature

Patent Literature 1: Japanese Patent Laid-Open Publication No. 2011-155786

SUMMARY OF INVENTION

Technical Problem

Since the output voltage of a DC power source changes according to an SOC (State Of Charge: charge rate to 100% full charge), there exists a problem in which the power conversion device disclosed by Patent Literature 1 cannot output a stable voltage.

The present invention has been made for solving such a problem, and an object is to provide a power conversion device and a power conversion method which can output a stable voltage even when the voltage of the DC power source varies.

Solution to Problem

In order to achieve the above purpose, the present invention includes: a voltage converter connected to a DC power source to convert the output voltage of the DC power source; a voltage controller that controls the output voltage of the each voltage converter; and an inverter circuit provided on the output side of the voltage converter to convert the voltage output from the voltage converter into an AC voltage.

BRIEF DESCRIPTION OF DRAWINGS

FIGS. 10(a) to 10(d) are circuit diagrams showing power conversion devices according to modifications of the present invention.

DESCRIPTION OF EMBODIMENTS

Hereinafter, embodiments of the present invention will be explained according to the drawings.

Explanation of a First Embodiment

Figure 1:
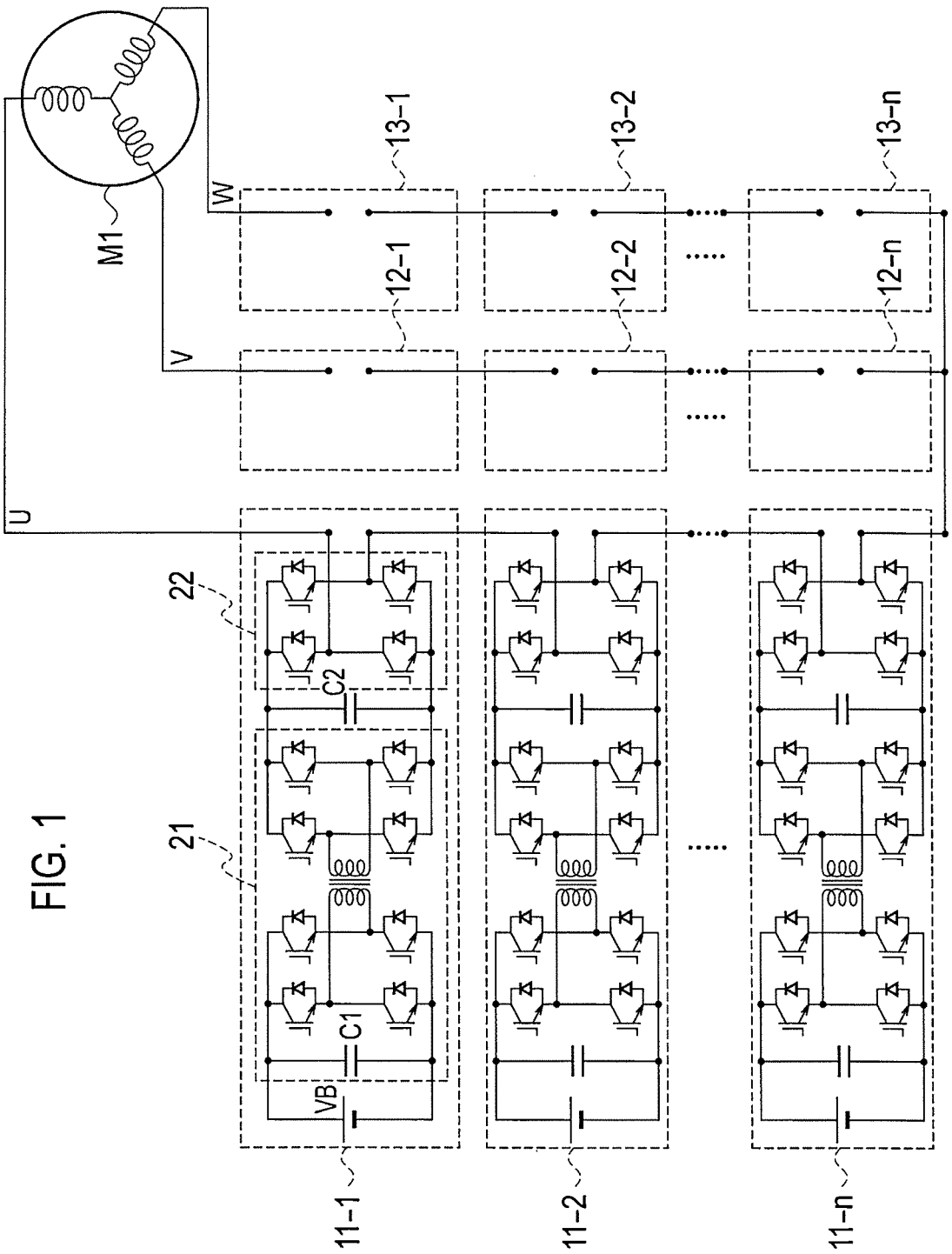
FIG. 1 is a circuit diagram showing a configuration of a power conversion device according to a first embodiment of the present invention.

FIG. 1 is a circuit diagram showing a configuration of a power conversion device according to a first embodiment of the present invention. The power conversion device shown in FIG. 1 drives a three-phase Alternating Current (AC) motor (hereinafter, simply referred to as "motor M1") by supplying AC voltages having phases 120 degrees different from each other for a U-phase, a V-phase, and a W-phase of the motor M1. Additionally, n power source modules 11-1, 11-2, . . . , 11-n are provided for the U-phase. Furthermore, n power source modules 12-1, 12-2, . . . , 12-n are provided for the V-phase. Moreover, n power source modules 13-1, 13-2, . . . , 13-n are provided for the W-phase. Note that n indicates an optional natural number, and the number of the power source modules is not limited to the case of a predetermined number in the present invention. Since respective (3×n) power source modules shown in FIG. 1 have the same configuration, the power source module 11-1 will be explained in the following.

The power source module 11-1 includes a Direct Current (DC) power source VB, a DC/DC converter 21 (voltage converter) connected to the DC power source VB to thereby convert output voltage, and an H-bridge circuit 22 (inverter circuit) provided on the output side of the DC/DC converter 21 to thereby convert a DC voltage output from the DC/DC converter 21 into an AC voltage. In addition, a capacitor C1 for removing higher harmonic wave components is provided between the plus electrode and the minus electrode of the DC power source VB, and further a capacitor C2 for smoothing is provided between the DC/DC converter 21 and the H-bridge circuit 22.

Figure 2:
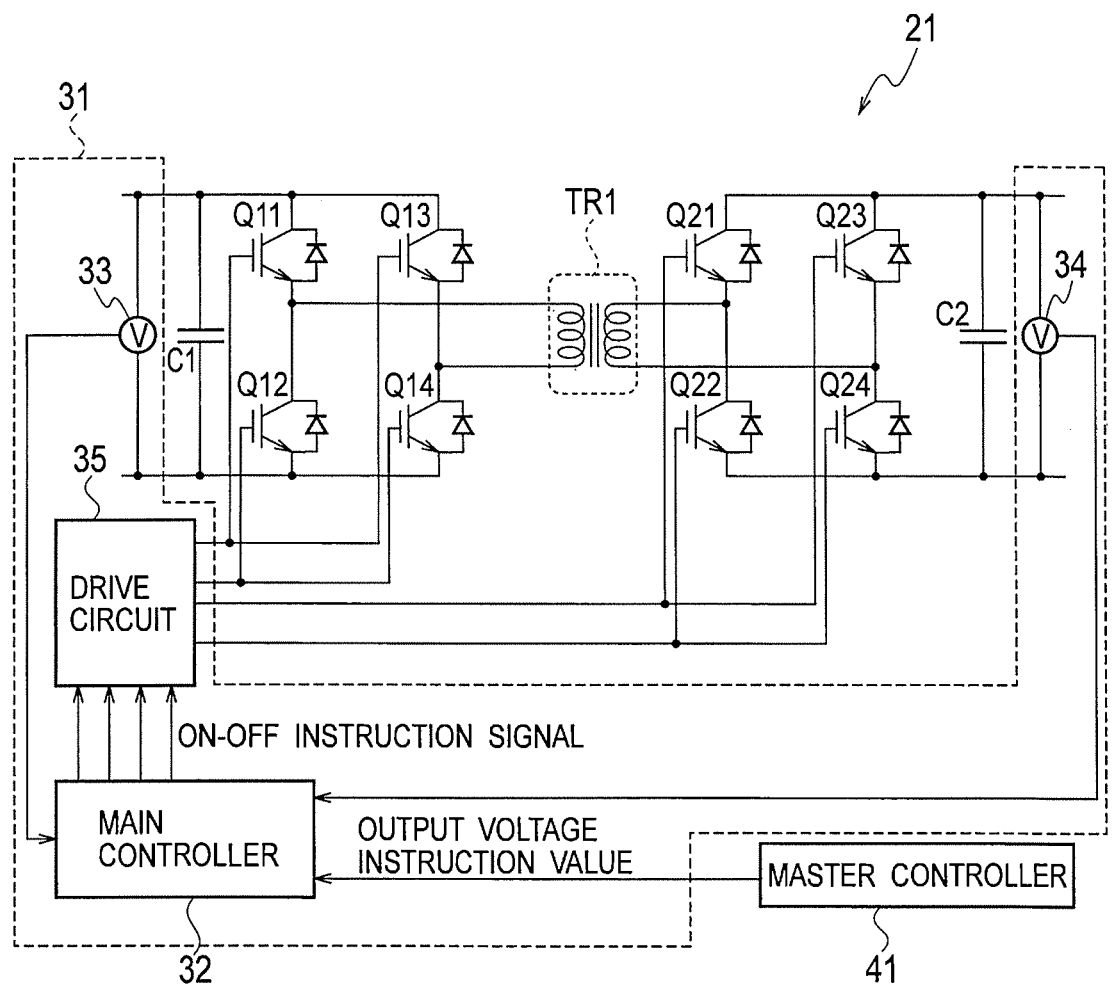
FIG. 2 is a block diagram showing detailed configurations of a DC/DC converter and a control device in the power conversion device according to the first embodiment of the present invention.

FIG. 2 is a circuit diagram showing configurations of the DC/DC converter 21 and a control device 31 (voltage controller) that controls the DC/DC converter 21. As shown in FIG. 2, the DC/DC converter 21 has a primary circuit provided with four electronic switches Q11 to Q14 and a secondary circuit also provided with four electronic switches Q21 to Q24, and these circuits are coupled to each other via a transformer TR1 having an m:n transformation ratio. Here, m corresponds to the primary side of the transformer TR1 and n corresponds to the secondary side of the transformer TR1. Each of the electronic switches Q11 to Q14 and Q21 to Q24 is constituted of an IGBT (Insulating Gate Bipolar Transistor), and a diode is provided between the two terminals of each of the electronic switches Q11 to Q14 and Q21 to Q24. The DC/DC converter 21 is constituted as a dual active bridge circuit in which the primary circuit and the secondary circuit are insulated from each other by the transformer TR1.

Furthermore, there is provided the control device 31 (voltage controller) that controls the drive of the DC/DC converter 21, and the control device 31 includes a main controller 32, a drive circuit 35, an input voltage sensor 33 (voltage detector), and an output voltage sensor 34. The input voltage sensor 33 measures the output voltage of the DC power source VB shown in FIG. 1, that is, the input voltage of the DC/DC converter 21 (denoted by input voltage V1). The output voltage sensor 34 measures the output voltage of the DC/DC converter 21 (denoted by output voltage V2).

As shown in FIG. 1, the H-bridge circuit 22 is provided with four electronic switches (IGBTs in FIG. 1), and the DC voltage output from the DC/DC converter 21 is converted into the AC voltage by the switching operation of these electronic switches. Furthermore, since the output terminals of the H-bridge circuits 22 of the n power source modules 11-1 to 11-n provided for the U-phase are serially connected respectively, the AC voltages output from each of the H-bridge circuits 22 are added in series to thereby be supplied to the motor M1. That is, the output terminals of the respective H-bridge circuits 22 (inverter circuits) are serially connected to each other, and the AC voltage in which the output voltages of the respective H-bridge circuits 22 are added by this series connection becomes an output voltage to be supplied to the load.

The main controller 32 generates on-off instruction signals for the respective electronic switches Q11 to Q14, Q21 to Q24 on the basis of an output voltage instruction value output from a master controller 41 of a higher level device, the input voltage V1 measured by the input voltage sensor 33, and the output voltage V2 measured by the output voltage sensor 34.

The drive circuit 35 outputs a drive signal to a control terminal (base) in each of the electronic switches Q11 to Q14 and Q21 to Q24 on the basis of the on-off instruction signal output from the main controller 32.

The main controller 32 can be constituted as an integrated-type computer constituted of, for example, a central processing unit (CPU) and a storage unit such as a RAM, a ROM, or a hard disk.

Next, the action of the power conversion device according to the first embodiment will be explained. The present embodiment controls the drive of the DC/DC converter 21 so that the DC voltage supplied to the H-bridge circuit 22 (output voltage V2 detected by the output voltage sensor 34 of FIG. 2) becomes a predetermined reference voltage Vref even when the output voltage of the DC power source VB shown in FIG. 1 is reduced or increased. Accordingly, the main controller 32 makes a comparison between the input voltage V1 of the DC/DC converter 21 detected by the input voltage sensor 33 and a value calculated by "Vref·m/n", and controls the drive of each of the electronic switches Q11 to Q14, and Q21 to Q24 so that the output voltage V2 detected by the output voltage sensor 34 becomes the reference voltage Vref. Specifically, the main controller 32 detects the variation of the input voltage V1, and controls the drive of each of the electronic switches Q11 to Q14 and Q21 to Q24 so that the output voltage V2 becomes stable at the reference voltage Vref.

In the control of the electronic switches Q11 to Q14, the electronic switches Q11 and Q14 are controlled so as to be synchronized with each other and controlled so as to have the same on-off state. Furthermore, the electronic switches Q12 and Q13 are controlled to so as to be synchronized with each other and controlled so as to have the same on-off state. On the other side, the electronic switches Q11 and Q12 are controlled so as not to have the on-states at the same time, for prevention of short circuit. Similarly, the electronic switches Q13 and Q14 are controlled so as not to have the on-states at the same time, for prevention of short circuit.

The electronic switches Q11 and Q14 are control-led so as to be periodically turned on/off. The electronic switches Q12 and Q13 are also controlled so as to be periodically turned on/off as the electronic switches Q11 and Q14, and the electronic switches Q12 and Q13 are controlled with the phase delayed by 180 degrees from the phase of the electronic switches Q11 and Q14.

In the control of the electronic switches Q21 to Q24, the electronic switches Q21 and Q24 are controlled so as to be synchronized with each other and controlled so as to have the same on-off state. Moreover, the electronic switches Q22 and Q23 are controlled so as to be synchronized with each other and controlled so as to have the same on-off state. On the other side, the electronic switches Q21 and Q22 are controlled so as not to have the on-states at the same time, for prevention of short circuit. Similarly, the electronic switches Q23 and Q24 are controlled so as not to have the on-states at the same time, for prevention of short circuit.

The electronic switches Q21 and Q24 are controlled so as to be periodically turned on/off. The electronic switches Q22 and Q23 are also controlled so as to be periodically turned on/off as the electronic switches Q21 and Q24, and the electronic switches Q22 and Q23 are controlled with the phase delayed by 180 degrees from the phase of the electronic switches Q21 and Q24.

Hereinafter, the on-off control of each of the electronic switches Q11 to Q14 and Q21 to Q24 will be explained in the case where the output of the DC power source VB is stable ("V1=Vref·m/n"), in the case where the output of the DC power source VB is reduced ("V1<Vref·m/n"), and in the case where the output of the DC power source VB is increased ("V1>Vref·m/n").

Note that, hereinafter, the transformation ratio m:n of the transformer TR1 provided in the DC/DC converter 21 is assumed to be 1:1, for simpler explanation. That is, since "m/n=1", the case where the output of the DC power source VB is stable will be explained as the case of "V1=Vref", the case where the output of the DC power source VB is reduced" will be explained as the case of "V1<Vref", and the case where the output of the DC power source VB is increased will be explained as the case of "V1>Vref".

[Case of V1=Vref]

Figure 3:
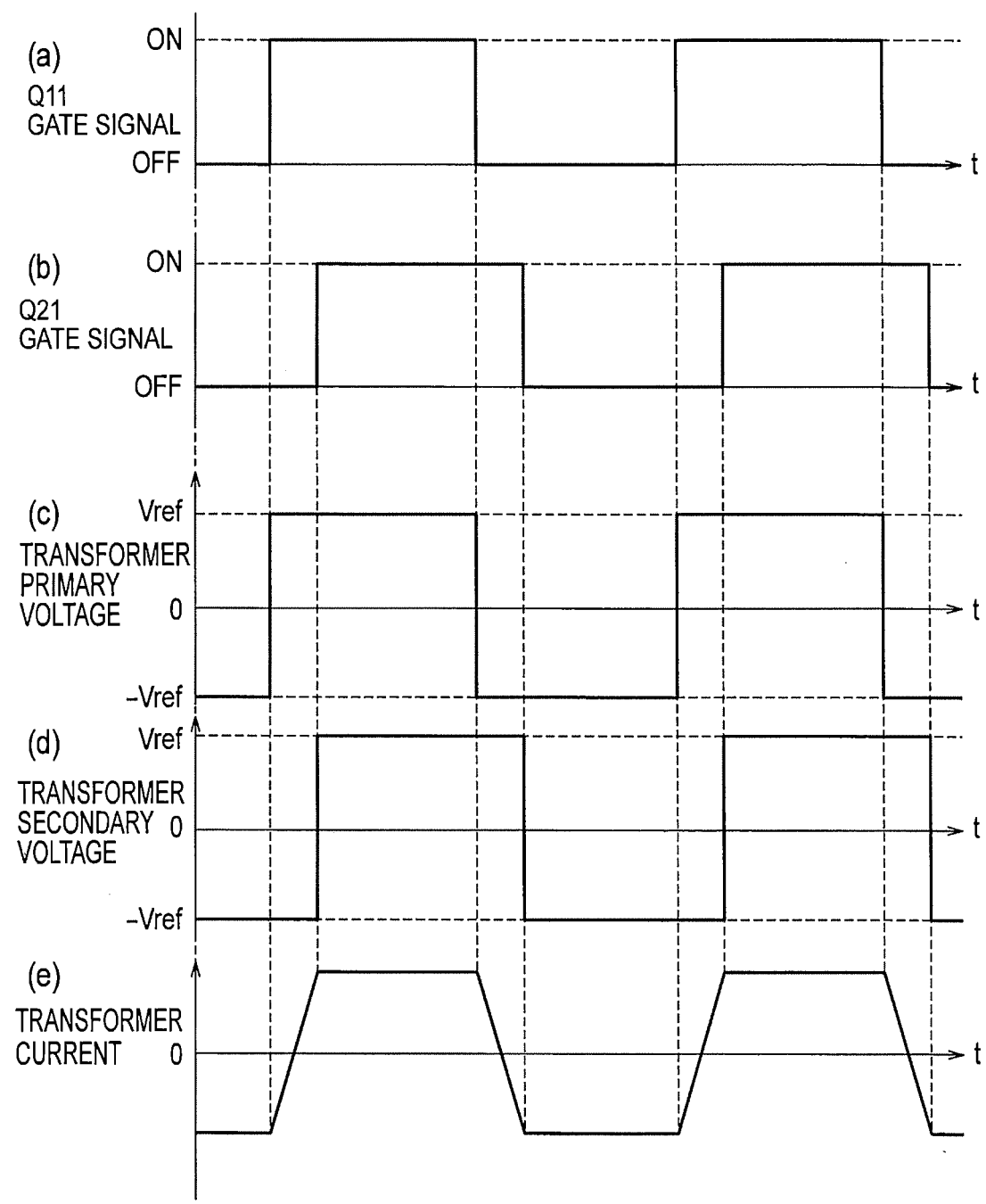
FIGS. 3(a) to 3(e) are timing charts showing respective output waveforms when an input voltage V1 is equal to a reference voltage Vref in the power conversion device according to the first embodiment of the present invention.

Each of FIGS. 3(a) to 3(e) is a timing chart showing the change of each signal in the case of "V1=Vref (i.e., V1=Vref·m/n). FIGS. 3(a) and 3(b) show the actions of the electronic switches Q11 and Q21, respectively, and FIG. 3(c) shows the primary-side voltage of the transformer TR1 (transformer primary voltage), FIG. 3(d) shows the secondary-side voltage of the transformer TR1 (transformer secondary voltage), and FIG. 3(e) shows the change of the current flowing to the secondary side of the transformer TR1.

In the case of V1=Vref, the output voltage of the DC power source VB is a stable output, and it is not necessary to increase or reduce the voltage. Accordingly, the electronic switch Q11 of the DC/DC converter 21 is controlled so as to be periodically turned on/off as shown in FIG. 3(a). Note that also Q14 is controlled to be turned on/off similarly to Q11.

Furthermore, as shown in FIG. 3(b), the electronic switch Q21 is periodically turned on/off by being slightly delayed from the on-off timing of Q11. At this time, Q21 is turned on/off in the same duty ratio as Q11. Note that Q24 is also turned on/off similarly to Q21.

Thereby, as shown in FIG. 3(c), a rectangular pulse voltage is generated on the primary side of the transformer TR1. Furthermore, as shown in FIG. 3(d), a voltage of the same level as that on the primary side is generated on the secondary side of the transformer TR1 with a slight phase delay from the pulse on the primary side. That is, V1=V2=Vref holds. Moreover, secondary current flows in the transformer TR1 as shown in FIG. 3(e).

[Case of V1<Vref]

Figure 4:
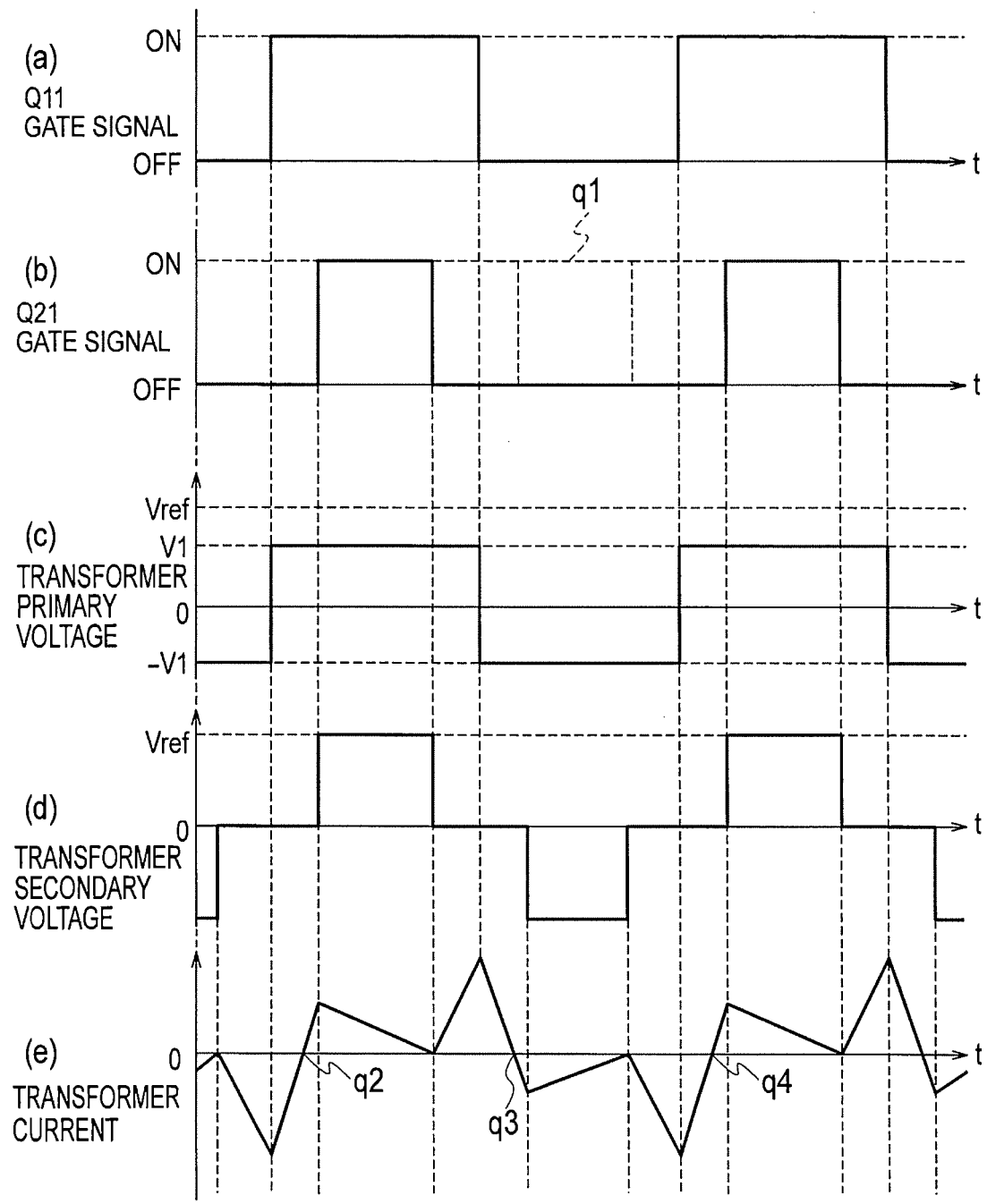
FIGS. 4(a) to 4(e) are timing charts showing respective output waveforms when the input voltage V1 is smaller than the reference voltage Vref in the power conversion device according to the first embodiment of the present invention.

Each of FIGS. 4(a) to 4(e) is a timing chart showing the change of each signal in the case where the output of the DC power source VB is lowered, resulting in "V1<Vref (i.e., V1<Vref·m/n). FIGS. 4(a) and 4(b) show the actions of the electronic switches Q11 and Q21, respectively, FIG. 4(c) shows the primary-side voltage of the transformer TR1 (transformer primary voltage), FIG. 4(d) shows the secondary-side voltage of the transformer TR1 (transformer secondary voltage), and FIG. 4(e) shows the change of current flowing to the secondary side (transformer current) of the transformer TR1.

In the case of V1<Vref, when the DC voltage is output without being stepped up as it is, the AC voltage supplied to the motor M1 shown in FIG. 1 is lowered, and thus the motor M1 cannot be stably operated. Accordingly, it is necessary to step up the input voltage V1 of the DC/DC converter 21 and to use the output voltage V2 as Vref. As shown in FIG. 4(a), the electronic switch Q11 of the DC/DC converter 21 is controlled to be periodically turned on/off. At this time, the electronic switch Q22 is also turned on/off similarly.

Furthermore, as shown in FIG. 4(b), the electronic switch Q21 is turned on during the on-period of the electronic switch Q11. At this time, as to the duty ratio of the on-off control of the electronic switch Q21, the electronic switch Q21 is turned on at a duty ratio smaller than the duty ratio of Q11. Moreover, the electronic switches Q22 and Q23 are turned on with the phase delayed by 180 degrees from the phase of the electronic switch Q21, as indicated by sign q1 in FIG. 4(b).

As a result, the primary-side voltage of the transformer TR1 changes such that plus and minus are switched in a constant period as shown in FIG. 4(c). At this time, the voltage output by the DC power source VB, that is, the input voltage V1 of the DC/DC converter 21 does not reach the reference voltage Vref. Accordingly, the amplitude of the pulse signal shown in FIG. 4(c) does not reach the reference voltage Vref.

On the other side, as shown in FIG. 4(d), the secondary-side voltage of the transformer TR1 has a smaller duty ratio than the primary-side voltage, and the amplitude of the pulse signal reaches the reference voltage Vref. Accordingly, also when the output voltage of the DC power source VB is lower than the reference voltage Vref, it is possible to step up the output voltage V2 of the DC/DC converter 21 to the reference voltage Vref.

Furthermore, the secondary current I1 flowing to the transformer TR1 (transformer current) changes as shown in FIG. 4(e). As shown in FIG. 4(e), the timing when the direction of the secondary current changes, that is, the timing of the switching from plus to minus or the timing of the switching from minus to plus (portion indicated by q2, q3, or q4 in the drawing) exists at a time period when all the secondary side electronic switches Q21 to Q24 are turned off. Accordingly, it is possible to suppress noise caused at the time of the switching of the electronic switch, and to perform soft switching.

[Case of V1>Vref]

Figure 5:
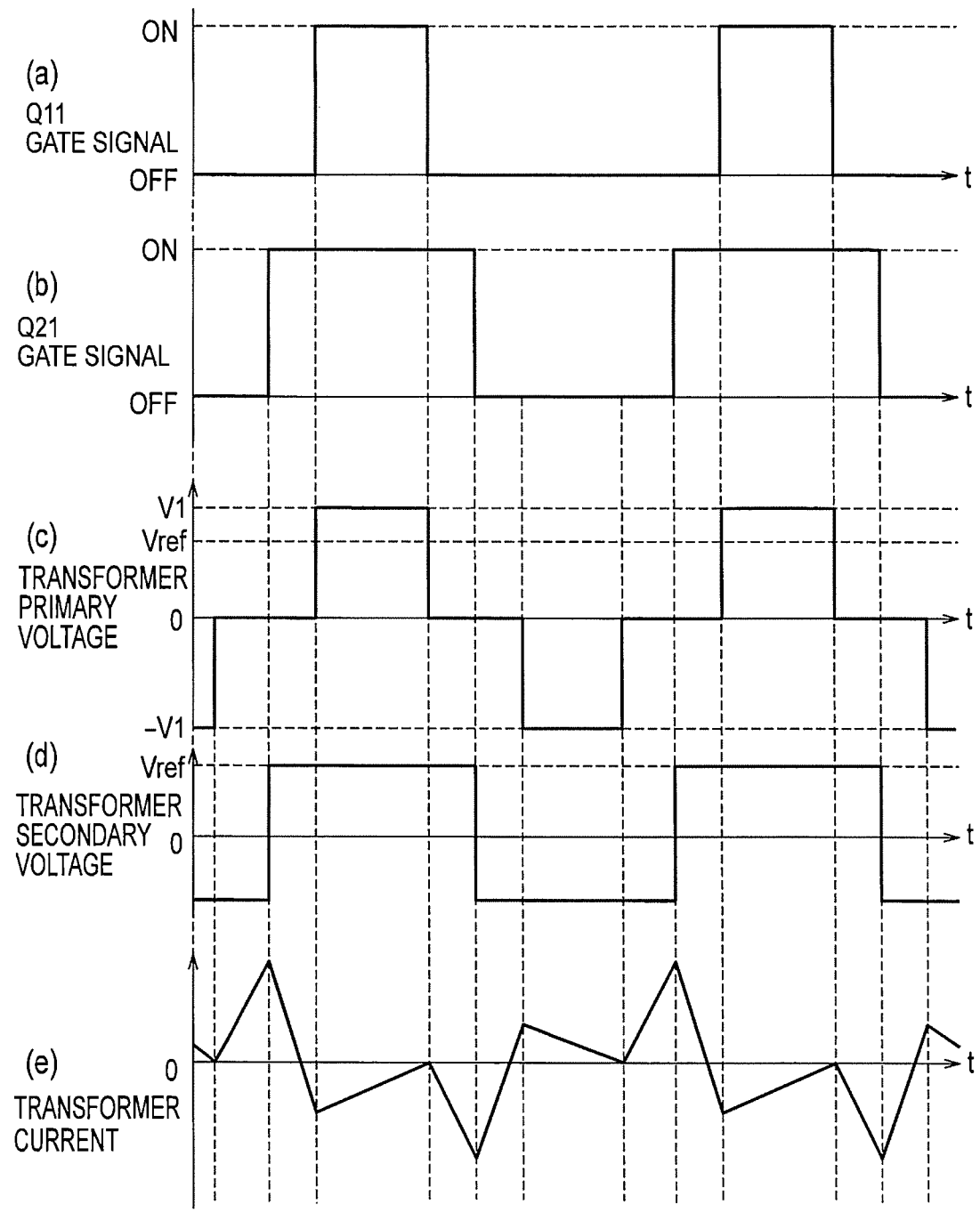
FIGS. 5(a) to 5(e) are timing charts showing respective output waveforms when the input voltage V1 is larger than the reference voltage Vref in the power conversion device according to the first embodiment of the present invention.

Each of FIGS. 5(a) to 5(e) is a timing chart showing the change of each signal in the case where the output voltage of the DC power source VB is heightened, resulting in "V1>Vref (i.e., V1>Vref·m/n). FIGS. 5(a) and 5(b) show the actions of the electronic switches Q11 and Q21, respectively, FIG. 5(c) shows the primary-side voltage of the transformer TR1, FIG. 5(d) shows the secondary-side voltage of the transformer TR1, and FIG. 5(e) shows the change of the current flowing to the secondary side (transformer current) of the transformer TR1.

In the case of V1>Vref, when the DC voltage is output without being stepped down as it is, the AC voltage supplied to the motor M1 shown in FIG. 1 becomes too high, and thus the motor M1 cannot be stably operated. Accordingly, it is necessary to step down the input voltage V1 of the DC/DC converter 21 and to set the output voltage V2 to be Vref. As shown in FIG. 5(a), the electronic switch Q11 of the DC/DC converter 21 is controlled to be periodically turned on/off. Furthermore, as shown in FIG. 5(b), the electronic switch Q21 is turned on at a duty ratio larger than the duty ratio of Q11 so as to include the on-period of the electronic switch Q11. Moreover, the electronic switches Q22 and Q23 are turned on during the off-period of the electronic switch Q21.

As a result, the primary-side voltage of the transformer TR1 changes so as to intermittently switch between plus and minus as shown in FIG. 5(c). At this time, since the voltage of the DC power source VB increases, the amplitude of the pulse signal is higher than the reference voltage Vref. On the other side, as shown in FIG. 5(d), the secondary-side voltage has a larger duty ratio than the primary-side voltage and the amplitude of the pulse signal is lowered to the reference voltage Vref. Accordingly, also when the output voltage of the DC power source VB is higher than the reference voltage Vref, it is possible to step down the output voltage V2 of the DC/DC converter 21 to the reference voltage Vref.

Furthermore, the secondary current I1 flowing to the transformer TR1 (transformer current) changes as shown in FIG. 5(e). As shown in FIG. 5(e), the timing when the direction of the secondary current changes, that is, the timing of the switching from plus to minus or the timing of the switching from minus to plus exists at a time period when all the primary side electronic switches Q11 to Q14 are turned off. Accordingly, it is possible to suppress noise caused at the time of the switching of the electronic switch, and to perform soft switching.

In this way, in the power conversion device according to the first embodiment, the DC/DC converter 21 is provided between the DC power source VB and the H-bridge circuit 22, and the output voltage of the DC/DC converter 21 is changed in accordance with the input voltage V1 output from the DC power source VB. Accordingly, it is possible to output a stable voltage.

Further, in the power conversion device according to the first embodiment, when the input voltage V1 output from the DC power source VB is lower than the reference voltage Vref, the input voltage V1 is stepped up and the output voltage V2 is used as the reference voltage Vref. On the other side, when the input voltage V1 output from the DC power source VB is higher than the reference voltage, this input voltage V1 is stepped down and the output voltage V2 is used as the reference voltage Vref. Accordingly, also when variation is caused in the output voltage of the DC power source VB, it is possible to use the output voltage V2 of the DC/DC converter 21 as the reference voltage Vref. As a result, it is possible to stabilize the AC voltage output from the H-bridge circuit 22, and resultantly, it becomes possible to stably drive the motor M1.

Moreover, since the dual active bridge circuit is used as the DC/DC converter 21, it becomes possible to achieve smaller size and higher efficiency of the device. Additionally, since the H-bridge circuit 22 is used as the inverter circuit, it becomes possible to enlarge the voltage range of the output voltage.

Note that, although one power source module 11-1 has been explained in the above embodiment, all the power source modules in the present embodiment have the same configuration and the voltage control by the DC/DC converter 21 is performed in each of the power source modules.

Explanation of a Second Embodiment

Figure 6:
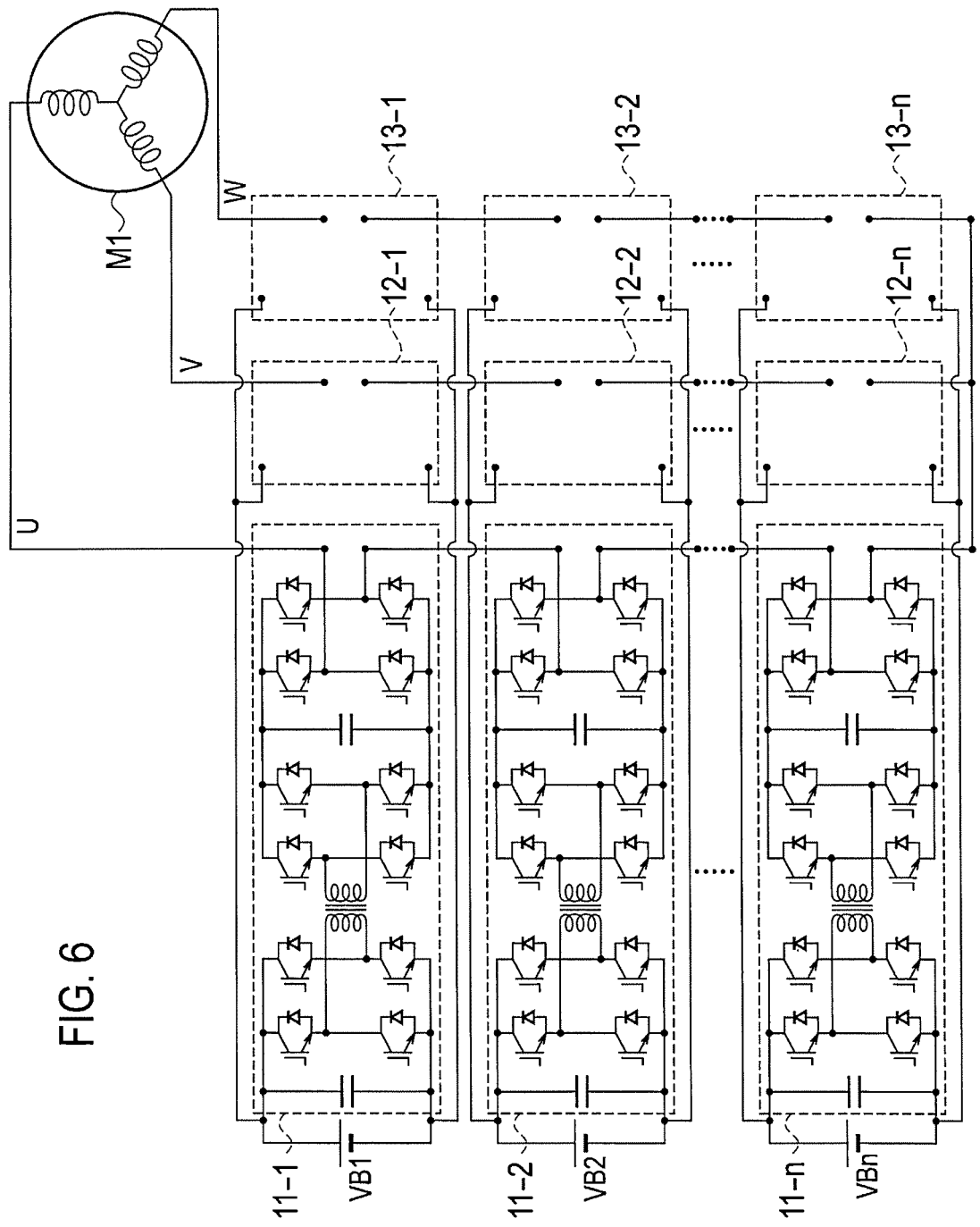
FIG. 6 is a circuit diagram showing a configuration of a power conversion device according to a second embodiment of the present invention.

Next, a second embodiment of the present invention will be explained. FIG. 6 is a circuit diagram showing a configuration of a power conversion device according to the second embodiment. The second embodiment is different from the first embodiment in that the DC power source is commonalized. That is, the power source module 11-1 for the U-phase, the power source module 12-1 for the V-phase, and the power source module 13-1 for the W-phase are connected to the same DC power source VB1. Moreover, the power source module 11-2 for the U-phase, the power source module 12-2 for the V-phase, and the power source module 13-2 for the W-phase are connected to the same DC power source VB2. Similarly, the power source module 11-$n$ for the U-phase, the power source module 12-$n$ for the V-phase, and the power source module 13-$n$ for the W-phase are connected to the same DC power source VBn. In other words, n power source modules are provided for one phase, and the k-th (1≤k≤n) power source module in order from a low voltage side to a high voltage side is connected to the common DC power source VB. The configuration except this point is the same as that of the first embodiment shown in FIG. 1.

Then, in the power conversion device according to the second embodiment, since the DC power source VB is commonalized among a plurality of phases, it becomes possible to reduce the number of DC power sources VB.

Explanation of a Third Embodiment

Figure 7:
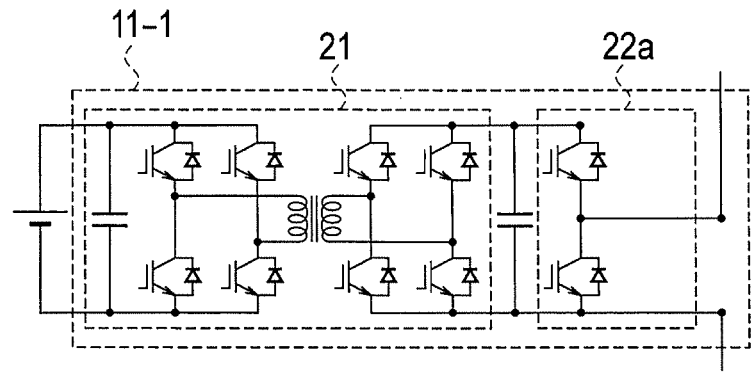
FIG. 7 is a circuit diagram of a power source module when a half bridge circuit is used as an inverter circuit.

Subsequently, a third embodiment of the present invention will be explained. FIG. 7 is a circuit diagram showing a configuration of a power source module 11-1 used in a power conversion device according to the third embodiment. The third embodiment is different from the first and second embodiments in that the H-bridge circuit 22 is replaced by a half bridge circuit 22a as the inverter circuit. That is, the different point is that the four electronic switches are provided in the H-bridge circuit 22 shown in FIG. 1, whereas two electronic switches are provided in the half bridge circuit 22a shown in FIG. 7. Furthermore, also in the third embodiment constituted in this way, it is possible to obtain the same effect as in the above first and second embodiments. Moreover, since the half bridge circuit is used, it becomes possible to simplify the circuit configuration.

Explanation of a Fourth Embodiment

Figure 8:
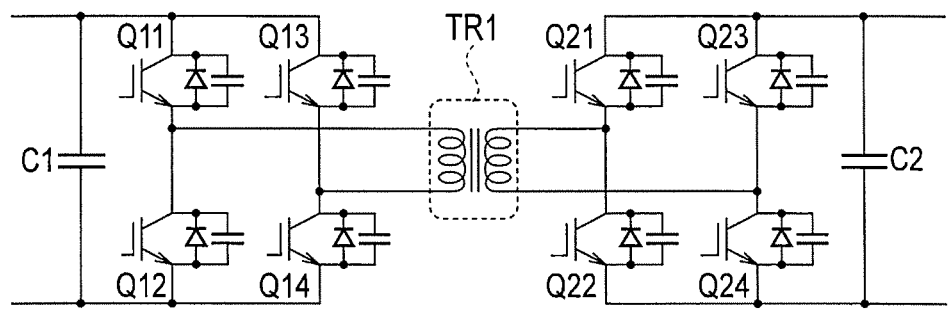
FIG. 8 is a circuit diagram showing a configuration of a power conversion device according to a modification of the present invention and shows a case of providing a capacitor for an IGBT.

Then, a fourth embodiment of the present invention will be explained. FIG. 8 is a circuit diagram showing a configuration of a DC/DC converter 21 used in a power conversion device according to the fourth embodiment. The fourth embodiment is different from the above first and second embodiments in that a capacitor is provided for each of the electronic switches Q11 to Q14 and Q21 to Q24. Furthermore, also in the fourth embodiment constituted in this way, it is possible to obtain the same effect as in the first embodiment and the second embodiment. Moreover, soft switching becomes possible and suppression of noise at the time of the switching becomes possible, by providing the capacitor for each of the electronic switches.

Explanation of a Fifth Embodiment

Figure 9:
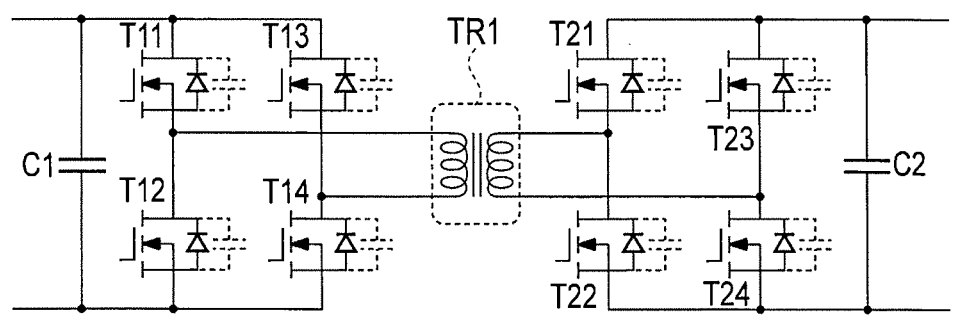
FIG. 9 is a circuit diagram showing a configuration of the power conversion device according to the modification of the present invention and shows a case of using a MOSFET as an electronic switch.

Next, a fifth embodiment of the present invention will be explained. FIG. 9 is a circuit diagram showing a configuration of a DC/DC converter 21 used in a power conversion device according to the fifth embodiment. The fifth embodiment is different from the fourth embodiment shown in FIG. 8 in that electronic switches T11 to T14 and T21 to T24 which are each constituted of a MOSFET are used instead of the electronic switches Q11 to Q14 and Q21 to Q24 which are each constituted of the IGBT. By the configuration like this, it becomes possible to perform soft switching without providing the capacitor between both ends of the IGBT as shown in FIG. 1. Accordingly, it is possible to suppress noise caused at the time of the switching.

Explanation of a Sixth Embodiment

Next, a sixth embodiment of the present invention will be explained. FIGS. 10(a) to 10(d) are circuit diagrams showing configurations of power conversion devices according to the sixth embodiment. FIG. 10(a), FIG. 10(b), FIG. 10(c), and FIG. 10(d) show the cases of an LC series resonant type, an LLC series resonant type, an LCC series resonant type, and an LC parallel resonant type, respectively, in the primary circuit of a DC/DC converter 21. In each of the cases, it becomes possible to have a function equivalent to the snubber capacitor while realizing soft switching.

Generally, when circuit current is cut off by the shutoff of a switch in the case where there is no the snubber capacitor, sudden voltage change is caused by self inductance of the circuit and a spike-like high voltage is generated. This high voltage might cause damage to the switch itself or to surrounding electronic components and cause electromagnetic noise.

However, in each of the cases of FIGS. 10(a) to 10(d), soft switching is realized and also the sudden voltage change and the spike-like high voltage generation are suppressed. Therefore, in each of the cases, it is possible to prevent damage to the switch itself or to surrounding electronic components, and minimize the electromagnetic noise.

Although, hereinbefore, the embodiments of the present invention have been explained, these embodiments are only illustrative for easily understand the present invention, and the present invention is not limited to these embodiments. The technical scope of the present invention is not limited to the specific technical matters disclosed in the above embodiments and includes various modifications, changes, alternative technologies, and the like which can be easily introduced therefrom.

For example, although, in the above embodiments, an example of generating the three-phase AC voltage for driving the three-phase AC motor is explained, the present invention is not limited to this and can also be used for generating single-phase AC voltage.

This application claims the priority of Japanese Patent Application No. 2013-216278, filed on Oct. 17, 2013, the entire content of which is herein incorporated by reference.

INDUSTRIAL APPLICABILITY

The present invention provides a voltage converter between a DC power source and an inverter circuit, and thus can be utilized in outputting a stable AC voltage even when the output voltage of the DC power source varies.

REFERENCE SIGNS LIST

M1 three-phase AC motor
Q11, Q12, Q13, Q14, Q21, Q22, Q23, Q24 electronic switch
TR1 transformer
VB DC power source
11-1, 11-2, . . . , 11-$n$ power source module
12-1, 12-2, . . . , 12-$n$ power source module
13-1, 13-2, . . . , 13-$n$ power source module
21 DC/DC converter (voltage converter)
22 H-bridge circuit (inverter circuit)
22$a$ half bridge circuit (inverter circuit)
31 control device (voltage controller)
32 main controller
33 input voltage sensor (voltage detector)
34 output voltage sensor
35 drive circuit
41 master controller

The invention claimed is:

1. A power conversion device including a plurality of direct current power sources that converts an output voltage of each of the direct current power sources into an alternating current voltage, and outputs the converted alternating current voltage in series connection to an alternating current motor, the device comprising:
   a voltage converter connected to each of the direct current power sources to convert the output voltage of the direct current power sources and having a primary circuit and a secondary circuit insulated from each other by a transformer;
   a voltage controller that controls an output voltage of the each voltage converter;
   an inverter circuit provided on an output side of the voltage converter to convert the voltage output from the voltage converter into an alternating current voltage; and
   a voltage detector that detects an input voltage of the voltage converter, wherein
   the voltage controller,
      when the input voltage detected by the voltage detector is lower than a reference input voltage, controls the output voltage of the voltage converter so as to be stepped up to a reference output voltage by making smaller a duty ratio of switching control in the secondary circuit than a duty ratio of switching control in the primary circuit, and,
      when the input voltage detected by the voltage detector is higher than the reference input voltage, controls the output voltage of the voltage converter so as to be stepped down to the reference output voltage by making larger the duty ratio of the switching control in the secondary circuit than the duty ratio of the switching control in the primary circuit.

2. The power conversion device according to claim 1, wherein
   the voltage converter is a dual active bridge circuit in which the primary circuit and the secondary circuit are coupled to each other via the transformer.

3. The power conversion device according to claim 1, wherein
   the inverter circuit is serially provided in n pieces for each of a plurality of phases output by the power conversion device, and
   a direct current power source that supplies a voltage to a k-th ($1 \leq k \leq n$) inverter circuit among a plurality of inverter circuits provided for one phase is common with a direct current power source that supplies a voltage to a k-th inverter circuit among a plurality of inverter circuits provided for another phase.

4. The power conversion device according to claim 1, wherein
   the inverter circuit is an H-bridge circuit.

5. The power conversion device according to claim 1, wherein
   the inverter circuit is a half bridge circuit.

6. A power conversion method of including a plurality of direct current power sources, of converting an output voltage of each of the direct current power sources into an alternating current voltage, and of outputting the converted alternating current voltage in series connection to an alternating current motor, the method comprising the steps of:
   converting the output voltage of each of the direct current power sources by a voltage converter in which a primary circuit and a secondary circuit are insulated from each other by a transformer;
   converting the converted output voltage into an alternating current voltage; and
   detecting an input voltage of the voltage converter, wherein
   a voltage controller,
      when the input voltage detected by the step of detecting input voltage is lower than a reference input voltage, controls the output voltage of the voltage converter so as to be stepped up to a reference output voltage by making smaller a duty ratio of switching control in the secondary circuit than a duty ratio of switching control in the primary circuit, and,
      when the input voltage detected by the step of detecting input voltage is higher than the reference input voltage, controls the output voltage of the voltage converter so as to be stepped down to the reference output voltage by making larger the duty ratio of the switching control in the secondary circuit than the duty ratio of the switching control in the primary circuit.

* * * * *